United States Patent [19]
Arden et al.

[11] Patent Number: 5,729,323
[45] Date of Patent: Mar. 17, 1998

[54] LIGHT-ABSORBING AND ANTI-REFLECTIVE COATING FOR SUNGLASSES

[75] Inventors: Amy J. Arden; Michael J. Cumbo, both of Rochester, N.Y.

[73] Assignee: Baush & Lomb Incorporated, Rochester, N.Y.

[21] Appl. No.: 283,009

[22] Filed: Jul. 29, 1994

[51] Int. Cl.$^6$ .............................. G02C 7/10; G02B 1/10
[52] U.S. Cl. ............................................. 351/163; 359/586
[58] Field of Search ................................ 351/163, 164, 351/165; 359/586, 589

[56] References Cited

U.S. PATENT DOCUMENTS

| | | | |
|---|---|---|---|
| 4,261,645 | 4/1981 | Sawamura et al. | 359/586 |
| 4,802,755 | 2/1989 | Hensler | 351/163 |
| 5,190,896 | 3/1993 | Pucilowski | 501/64 |
| 5,362,552 | 11/1994 | Austin | 359/580 |

FOREIGN PATENT DOCUMENTS

| | | |
|---|---|---|
| 0409719 | 1/1991 | European Pat. Off. . |
| 4124937 | 3/1992 | Germany . |
| 558763 | 2/1975 | Switzerland . |
| 2247691 | 3/1992 | United Kingdom . |

OTHER PUBLICATIONS

Chemical Abstracts, vol. 110, No. 7, Apr 3, 1989.
A. Thelen, Design of Optical Interference Coatings (McGraw–Hill, NY, 1989), pp. 103–107.
H. A. Macleod, "A new approach to the design of metal–dielectric thin–film optical coatings", Optica Acta, vol. 24, No. 2 (1978), pp. 93—106.
P. H. Berning et al., "Induced Transmission in Absorbing Films Applied to Band Pass Filter Design", J. Opt. Soc. Amer., vol. 47, No. 3 (1957), pp. 230–239.

*Primary Examiner*—Scott J. Sugarman
*Attorney, Agent, or Firm*—Chris P. Konkol; Katherine McGuire; John E. Thomas

[57] ABSTRACT

A sunglass lens having improved anti-reflection and transmittance comprises a lens-shaped substrate and a coating formed on the concave surface of the lens. The first layer deposited adjacent to the concave surface of the lens comprises a titanium suboxide material, the second layer comprises a material having a high refractive index, and the third layer comprises a material having a low refractive index.

12 Claims, 1 Drawing Sheet

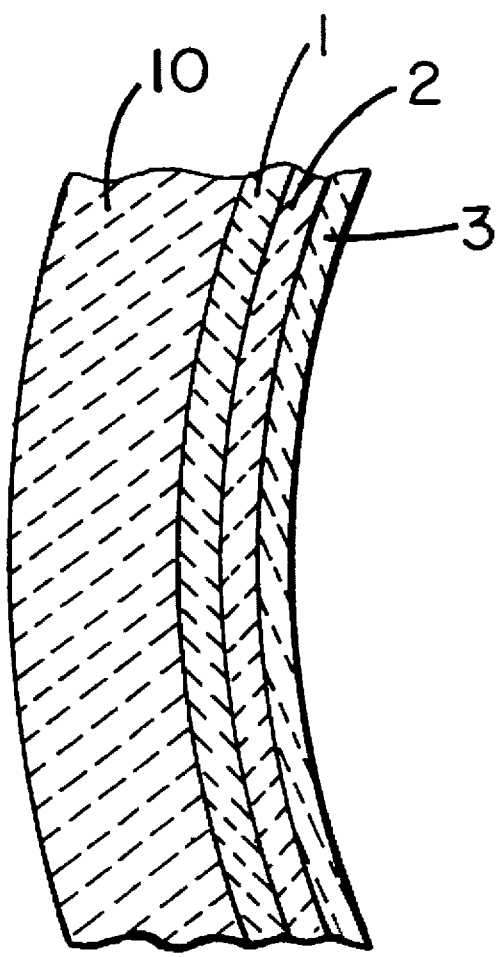

LIGHT-ABSORBING AND ANTI-REFLECTIVE COATING FOR SUNGLASSES

BACKGROUND OF THE INVENTION

The present invention relates to sunglass lenses having a multilayer coating, with improved transmittance and anti-reflection characteristics.

Sunglass lenses can be classified according to two general categories, general purpose sunglasses and special purpose sunglasses.

For both categories of sunglasses, it is important that the lenses provide a desired transmittance of light in the visible region. Standards for general purpose sunglass lenses indicate that the lens provides a luminous transmittance between 8% to 40%, and permits recognition of red, green and yellow traffic signal colors so that the lenses are suitable for driving conditions. Special purpose sunglasses are designed to function in more extreme conditions, and generally have a lower transmittance than general purpose sunglasses. Since the lenses of this latter class are designed for special purposes, the lenses do not need to pass color recognition tests.

One type of general purpose sunglass lenses is photochromic lenses, i.e., the transmittance varies with intensity of incident light and ambient temperature. For this type of lens, it is desirable that the lens meets the transmittance standards for general purpose sunglasses under normal use conditions.

For sunglass lenses, it is also important that reflection of visible light at the concave (or rear) lens surface is sufficiently low to avoid glare from incident light at the concave surface.

U.S. Pat. No. 4,802,755 (Hensler) describes a dual-purpose photochromic lens, i.e., the lens functions as a general purpose lens at 20° C. and as a special purpose lens at 0° C. The described lens is illustrative of a sunglass lens having very desirable transmittance and anti-reflective characteristics. More specifically, the lens has a photochromic glass substrate and a transmittance of approximately 10% at 20° C. in bright sunlight, wherein the overall transmittance of the substrate is reduced by coating both the convex (front) and concave (rear) surfaces with a titanium monoxide material. An anti-reflective magnesium fluoride layer is applied to the titanium monoxide layer on the concave surface.

The present invention provides a sunglass lens having improved transmittance and anti-reflection characteristics. This is accomplished using a multilayer coating that combines optical absorption and interference effects to reduce both the transmittance and concave surface reflection of the lens.

SUMMARY OF THE INVENTION

The invention relates to a sunglass lens comprising: a substrate in the shape of a lens; a first layer deposited adjacent to the concave surface of the lens, the first layer comprising $TiO_x$ wherein x is about 0.2 to 1.5; a second layer deposited adjacent to the first layer comprising a material having a refractive index of about 1.80 to 2.50; and a third layer deposited adjacent to the second layer and comprising a material having a refractive index of about 1.35 to 1.60.

BRIEF DESCRIPTION OF THE DRAWINGS

The FIGURE is an enlarged partial sectional view of a preferred embodiment of the invention.

DETAILED DESCRIPTION OF PREFERRED EMBODIMENTS

The FIGURE illustrates an embodiment of the invention. The substrate 10 on which the coating is applied has the form of a lens. The lens material may be glass or plastic. A first layer 1 is deposited adjacent to the lens 10 on the concave (rear) surface. A second layer 2 is deposited adjacent to the first layer 1, and a third layer 3 is deposited adjacent to the second layer 2.

Layer 1 comprises $TiO_x$ wherein x is about 0.2 to 1.5. Layer 1 partially absorbs light passing therethrough, thereby reducing transmittance of light, including light in the visible region of 400 to 700 nm. Preferably, this layer is selected so that it reduces transmittance of light therethrough by at least 10%, more preferably at least 20%. Generally, the thickness of layer 1 will be about 10 to 40 nm.

The imaginary part of the refractive index (k) of layer 1 is preferably in the range of about 0.2 to 2.4; this ensures adequate absorption. Additionally, the real part of the refractive index (n) of layer 2 is preferably in the range of about 1.50 to 2.50, more preferably in the range of about 1.60 to 2.00. (For comparison, a layer formed of $TiO_2$ has a k value that is near zero at all visible wavelengths, and an n value which is in the range of 2.2 to 2.5.)

Layer 1 may be deposited directly on the lens by methods generally known in the art, such as physical vapor deposition or chemical vapor deposition. Both oxygen and nitrogen are included in the reaction chamber to obtain a layer formed primarily of $TiO_x$, although the process may result in formation of other materials, such as titanium nitrides. By varying the pressures of the oxygen and nitrogen, the composition of the absorption layer can be optimized to obtain a layer having the desired optical properties. Additionally, transmittance of the lens can be controlled by varying the thickness of layer 1.

It is further preferred that the coated lens has a luminous transmittance between 8% to 40% (as determined by the American National Standard Institute, Inc., ANSI Z80.3-1986, incorporated herein by reference) and meets these ANSI requirements for recognition of red, green and yellow traffic signal colors so that the lenses are suitable for wear during driving.

Layer 2 is deposited adjacent to layer 1, and layer 3 is deposited adjacent to layer 2. Layer 2 comprises a material having a high refractive index (n), i.e., a refractive index of about 1.80 to 2.50. Representative materials include $Ta_2O_5$, $TiO_2$, $ZrO_2$ and $HfO_2$. Layer 3 comprises a material having a low refractive index (n), i.e., a refractive index of about 1.35 to 1.60. Representative materials include $MgF_2$ and $SiO_2$. Other materials having the high or low refractive index are known in the art. Layer 2 and 3 may be deposited by methods known in the art, such as physical vapor deposition or chemical vapor deposition. Generally, the third layer will have its interface with air, as shown in the embodiment of FIG. 1.

The materials and thicknesses of the second and third layers are selected so that these layers effectively reduce reflection at the concave (rear) lens surface. Generally, the physical thickness of layer 2 may be about 90 to 180 nm, and the physical thickness of layer 3 may be about 70 to 120 nm.

The transmittance of the lens will be dependent primarily on the thickness and k value of layer 1. Based on these parameters of layer 1, standard computer models can be used to determine optimum film thickness and n values of layers 2 and 3 to achieve anti-reflection, as will be evident to one skilled in the art.

Glare at the concave (rear) lens surface results from reflection of incident light at the concave surface. For an uncoated lens, a portion of incident light at the concave lens surface would be reflected from the concave surface of the lens towards the wearer's eye, and additionally, a portion of the non-reflected light passing through the lens would be reflected from the convex surface of the lens toward the wearer's eye.

In the present invention, reflectance at the concave lens surface is minimized since layers 2 and 3 are chosen to provide effective anti-reflection. Additionally, layer 1 further reduces reflected light. More specifically, this absorbing layer significantly increases the bandwidth of the anti-reflection coating. (This is an important consequence of layer 1 having a non-zero imaginary component of the refractive index (k).) Any non-reflected light at the concave surface must pass through layer 1 twice, once upon entering the coating, and again after passing through the lens and being reflected at the convex surface. It will be appreciated that each pass through layer 1 reduces transmittance of light therethrough.

According to the invention, luminous reflectance at an interface of said coating with air is no greater than 2%, preferably, no greater than 1%. Luminous reflectance is defined as the specular reflectance weighted by the photopic response of the eye, and may be calculated by methods disclosed in the aforementioned ANSI Z80.3-1976 standards.

Specific preferred embodiments are illustrated in the following examples.

EXAMPLES 1 AND 2

Representative coatings are shown in Tables 1 and 2. Each coating is designed for a lens made of a borosilicate glass having a neodymium oxide as a major colorant described in U.S. Pat. No. 5,190,896 (Pucilowski et al.) and which has a refractive index (n) of about 1.59 at a design wavelength of 550 nm.

TABLE 1

| Layer | Material | Physical Thickness (nm) |
|---|---|---|
| 10 | glass | — |
| 1 | $TiO_x$ | 17.0 |
| 2 | $Ta_2O_5$ | 61.0 |
| 3 | $MgF_2$ | 90.6 |
| air | — | — |

TABLE 2

| Layer | Material | Physical Thickness (nm) |
|---|---|---|
| 10 | glass | — |
| 1 | $TiO_x$ | 32.8 |
| 2 | $TiO_2$ | 43.2 |
| 3 | $MgF_2$ | 90.6 |
| air | — | — |

EXAMPLE 3

An additional representative coating is shown in Table 3. The coating is designed for a lens made of the photochromic borosilicate glass described in U.S. Pat. No. 4,802,755 which has a refractive index (n value) of about 1.523 at a design wavelength of 550 nm.

TABLE 3

| Layer | Material | Physical Thickness (nm) |
|---|---|---|
| 10 | glass | — |
| 1 | $TiO_x$ | 32.8 |
| 2 | $TiO_2$ | 43.2 |
| 3 | $MgF_2$ | 90.6 |
| air | — | — |

Table 4 lists luminous transmittance, and luminous reflectance at the concave (rear) surface. For comparison purposes, these properties for a lens described in U.S. Pat. No. 4,802,755 is listed as the Comparative Example.

TABLE 4

|  | % Luminous Transmittance | % Luminous Reflectance |
|---|---|---|
| Ex. 1 | 14.34 | 1.23 |
| Ex. 2 | 13.38 | 0.89 |
| Ex. 3 | 19.98 | 1.23 |
| Comp. Ex. | 19.32 | 7.75 |

The examples illustrate that the present invention provides sunglass lenses having very desirable transmittance and anti-reflection characteristics, and that the coatings may be applied to lens substrates with the coatings may be applied to lens substrates with different refractive index (n) values. Also, the coated lens of Example 3, corresponding to the present invention, exhibited similar transmittance but significantly less luminous reflectance at the concave surface than the lens made in accordance with U.S. Pat. No. 4,802,755.

A wide range of materials may be used for the lens substrate, especially plastic or glass (including photochromic glasses). Generally, the coating will not impart a change to the visible appearance of the lens material other than darkening. Preferably, the lens material is chosen so that it provides effective UV blocking.

It will be appreciated that no coatings are required on the convex (front) surface of the lens, affording reduced costs in manufacturing. Also, if desired, optional coatings can easily be formed on the convex surface, such as a hard coating or a scratch-resistant coating.

Although certain preferred embodiments have been described, it is understood that the invention is not limited thereto and modifications and variations would be evident to a person of ordinary skill in the art.

We claim:

1. A sunglass lens comprising a substrate in the shape of a lens which substrate has a concave surface and a convex surface, the concave surface having a coating comprising:

a first layer deposited adjacent to the concave surface of the substrate, said first layer comprising $TiO_x$ wherein x is about 0.2 to 1.5;

a second layer deposited adjacent to the first layer, said second layer comprising a material having a refractive index of about 1.80 to 2.50; and a third layer deposited adjacent to the second layer, said second layer comprising a material having a refractive index of about 1.35 to 1.60, wherein said first layer reduces transmittance of light therethrough by at least 10% and wherein the luminous reflectance at an interface of said coating with air is no greater than 2%.

2. The sunglass lens of claim 1, wherein the second layer comprises a material selected from the group consisting of $Ta_2O_5$, $TiO_2$, $ZrO_2$ and $HfO_2$.

3. The sunglass lens of claim 1, wherein the third layer comprises a material selected from the group consisting of $MgF_2$ and $SiO_2$.

4. The sunglass lens of claim 1, wherein the second layer comprises $Ta_2O_5$ and the third layer comprises $MgF_2$.

5. The sunglass lens of claim 1, wherein the first layer has an n value ranging from about 1.50 to 2.50.

6. The sunglass lens of claim 1, wherein the first layer has a value for the imaginary component of the refractive index ranging from about 0.2 to 2.4.

7. The sunglass lens of claim 1, having no coating on the convex surface of the lens.

8. The sunglass lens of claim 1, wherein the lens is formed of glass.

9. The sunglass lens of claim 1, wherein said first layer reduces transmittance of light therethrough by at least 10%.

10. The sunglass lens of claim 1, wherein the sunglass lens has a luminous transmittance between 8 to 40%.

11. The sunglass lens of claim 1, wherein luminous reflectance of visible light at an interface of said coating with air is no greater than 1%.

12. The sunglass lens of claim 11, wherein the sunglass lens has a luminous transmittance between 8 to 40%.

* * * * *